(12) United States Patent
Nakazawa et al.

(10) Patent No.: US 7,212,108 B2
(45) Date of Patent: May 1, 2007

(54) REMOTE CONTROL SYSTEM

(75) Inventors: Yuichi Nakazawa, Yamatokoriyama (JP); Masahiro Komatsu, Yamatokoriyama (JP)

(73) Assignee: Mori Seiki Co., Ltd., Yamatokoriyama-shi (JP)

( * ) Notice: Subject to any disclaimer, the term of this patent is extended or adjusted under 35 U.S.C. 154(b) by 136 days.

(21) Appl. No.: 10/950,455

(22) Filed: Sep. 28, 2004

(65) Prior Publication Data

US 2005/0114085 A1 May 26, 2005

(30) Foreign Application Priority Data

Oct. 9, 2003 (JP) ............................. 2003-350293

(51) Int. Cl.
*G08B 26/00* (2006.01)
*G06F 19/00* (2006.01)

(52) U.S. Cl. ................. 340/505; 340/680; 702/184; 700/169; 700/175

(58) Field of Classification Search ............... 340/505, 340/680; 702/184; 700/169, 175, 176, 178
See application file for complete search history.

(56) References Cited

U.S. PATENT DOCUMENTS 6,577,988 B1 * 6/2003 Travagline et al. ......... 702/188
6,909,995 B2 * 6/2005 Shiraishi .................... 702/188
6,954,680 B2 * 10/2005 Kreidler et al. ............ 700/169
6,963,786 B2 * 11/2005 Ogushi et al. .............. 700/108
2002/0013639 A1 * 1/2002 Fujishima et al. .......... 700/175
2004/0148131 A1 * 7/2004 Azpitarte .................... 702/184

FOREIGN PATENT DOCUMENTS

JP          5-108140          4/1993

* cited by examiner

*Primary Examiner*—Donnie L. Crosland
(74) *Attorney, Agent, or Firm*—Westerman, Hattori, Daniels & Adrian, LLP.

(57) ABSTRACT

When a trouble occurs in a machine tool (20) sold by a machine tool manufacturer to a customer, a failure analysis apparatus (11) installed in a service center (10) of the machine tool manufacturer remotely controls the machine tool (20) to obtain operation information or alarm information of the machine tool (20) and performs failure analysis based on such information. In the service center (10), a plurality of failure analysis apparatuses (11) comprising personal computers, and a server (12) which are connected to the failure analysis apparatuses (11) for communication and to which a global IP address for the exclusive use is allocated are installed. Machine tools (20) of customers are connectable to the server (12) via the Internet (30).

3 Claims, 4 Drawing Sheets

REMOTE CONTROL SYSTEM

BACKGROUND OF THE INVENTION

1. Field of the Invention

The present invention relates to a remote control system for remotely controlling various kinds of apparatuses.

2. Description of Related Art

When a machine tool manufacturer remotely analyzes failure of machine tools sold to customers, such a remote failure analysis system as described below is generally used. In this system, as shown in FIG. 4, machine tools 60 of customers and failure analysis apparatuses 51 installed in a service center 50 of the machine tool manufacturer are connected to each other via the Internet 70 for communication. The failure analysis apparatuses 51 of the service center 50 remotely controls the machine tools 60 when any trouble occurs in the machine tools 60 to obtain operation information or alarm information of the machine tools 60 and analyzes the failure based on such information, for example.

In such a system, when failure analysis is to be performed simultaneously with respect to the machine tools 60 of a plurality of customers, each of the failure analysis apparatuses 51 is directly connected to a respective one of the machine tools 60, and either one of the machine tool 60 and the failure analysis apparatus 51 as the server module waits for communication request from the other one as the client module.

However, when remote failure analysis is performed by connecting the machine tools 60 and the failure analysis apparatuses 51 directly to each other via the Internet 70, a global IP address for the exclusive use need be allocated to each of the machine tools 60 or each of the failure analysis apparatuses 51 for smooth connection of the communication channel. Therefore, as the number of machine tools 60 for which failure analysis is to be performed increases, the cost for obtaining and maintaining global IP addresses for the exclusive use increases, which is disadvantageous.

Since the above-described remote failure analysis of the machine tools 60 is not always performed but performed only when any trouble occurs in the machine tools 60, it is not economical for the machine tool manufacturer or the owner of the machine tools 60 to continue to bear the cost for maintaining the global IP address exclusive to each failure analysis apparatus or each machine tool.

SUMMARY OF THE INVENTION

It is, therefore, an object of the present invention to provide a remote control system which is capable of performing remote control simultaneously with respect to a plurality of apparatuses while suppressing the cost for maintaining the global IP address to the minimum.

According to the present invention, there is provided a remote control system comprising a plurality of object apparatuses to be controlled, a plurality of controlling apparatuses for controlling the object apparatuses, and a server for connecting the object apparatuses and the controlling apparatuses to each other for allowing communication therebetween. The server establishes a communication path between a particular one of the object apparatuses and a particular one of the controlling apparatuses only when both of the particular object apparatus and the particular controlling apparatus request communication.

Preferably, in the remote control system, object apparatuses to be controlled and/or controlling apparatuses can be registered in the server in advance as apparatuses which are allowed to be connected.

Preferably, the object apparatuses comprise machine tools, and the operating apparatuses comprise failure analysis apparatuses for analyzing failure of the machine tools while remotely controlling the machine tools. In such a case, the remote control system can be utilized for remote failure analysis of machine tools.

As described above, the remote control system according to the present invention includes a server for connecting a plurality of object apparatuses to be controlled and a plurality of controlling apparatuses to each other via a network for communication, and the object apparatuses and the controlling apparatuses make a request to the server for communication, respectively, as a client. Therefore, it is only necessary to allocate a management apparatus identifier (corresponding to a global IP address in the case of the Internet) for the exclusive use to the server. Accordingly, unlike the prior art remote failure analysis system in which object apparatuses to be controlled and controlling apparatuses are directly connected to each other via a network, it is unnecessary to allocate a management apparatus identifier for the exclusive use to each of the object apparatuses or each of the controlling apparatuses. Therefore, the cost for obtaining and maintaining the management apparatus identifier can be reduced to the minimum. Since it is unnecessary to newly obtain a management apparatus identifier even when the number of object apparatuses for which failure analysis is to be performed is increased, the scale of the system can be efficiently increased at a low cost.

Moreover, in the remote control system of the invention, the server establishes a communication path between a particular one of the object apparatuses and a particular one of the controlling apparatuses only when both of the particular object apparatus and the particular controlling apparatus request communication. Therefore, direct intrusion into the object apparatus or the controlling apparatus from e.g. an external network can be prevented, so that the system is advantageous also in terms of security.

Particularly, in the case where object apparatuses to be controlled and/or controlling apparatuses can be registered in the server in advance as apparatuses which are allowed to be connected, unauthorized access to the server from an apparatus which is not registered in the server is reliably prevented, whereby security is further enhanced.

The foregoing and other objects, features and effects of the present invention will become more apparent from the following description of the preferred embodiments with reference to the attached drawings.

DESCRIPTION OF THE PREFERRED EMBODIMENTS

Figure 1:
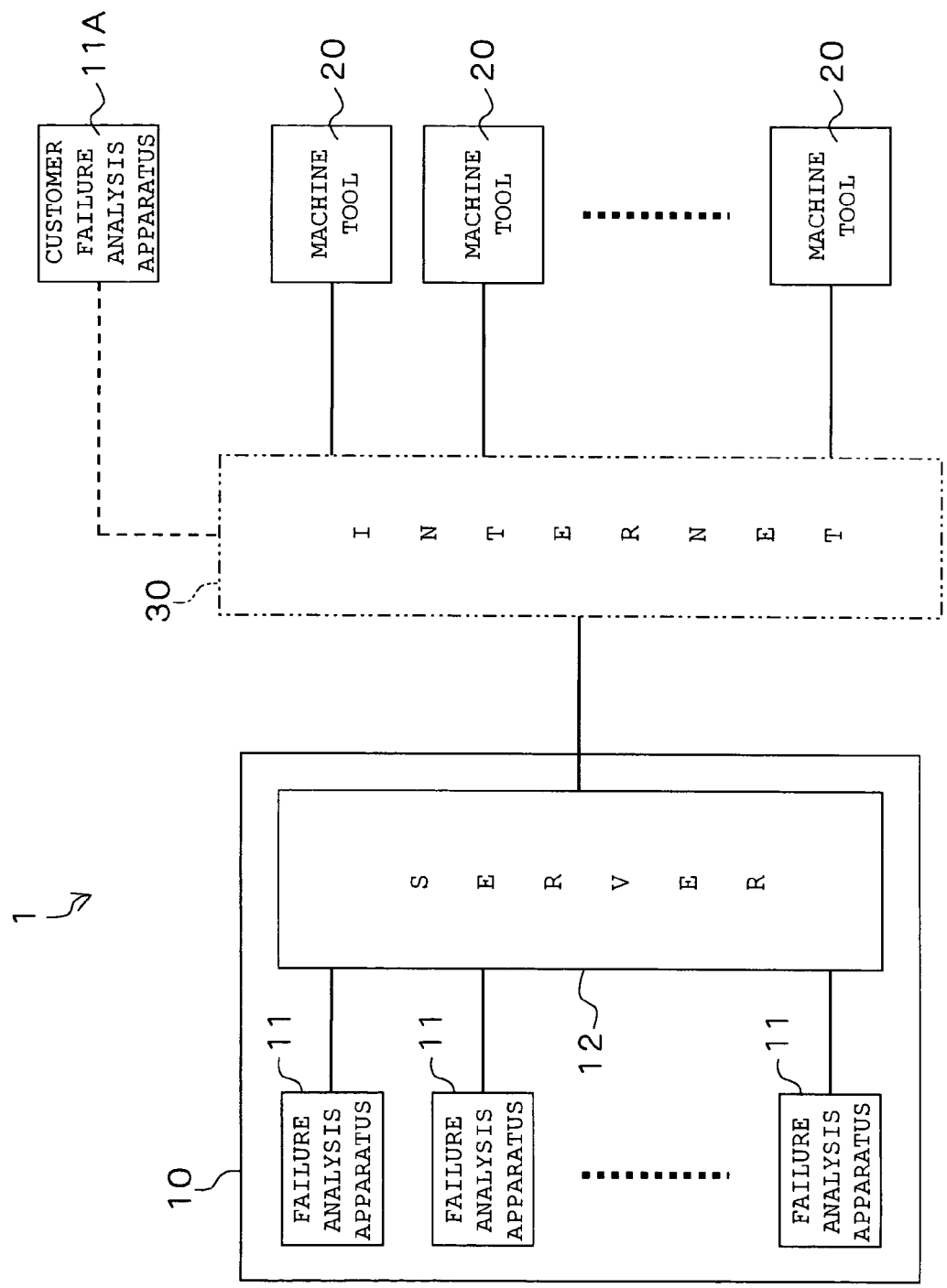
FIG. 1 is a schematic view showing the structure of a remote failure analysis system for machine tools as an embodiment of remote control system according to the present invention.

Preferred embodiments of the present invention will be described below with reference to the accompanying drawings. FIG. 1 shows a schematic structure of a remote failure analysis system 1 for a machine tool, which utilizes a remote control system according to the present invention. As shown in the figure, in the remote failure analysis system 1, when a trouble occurs in a machine tool 20 sold by a machine tool manufacturer to a customer, a failure analysis apparatus 11 installed in a service center 10 of the machine tool manufacturer remotely controls the machine tool 20 to obtain operation information or alarm information of the machine tool 20 and analyzes the failure based on such information.

Specifically, in the service center 10 of the machine tool manufacturer are installed a plurality of failure analysis apparatuses 11 comprising personal computers, and a server 12 to which the failure analysis apparatuses 11 are connected via a local area network (LAN) for communication. Machine tools 20 of each customer can connect to the server 12 via the Internet 30. Therefore, a global IP address for the exclusive use is allocated to the server 12.

The user ID and password of failure analysis apparatuses 11 authorized to perform remote failure analysis of machine tools 20 as well as the user ID and serial number of each machine tool 20 are registered in the server 12 in advance. When an apparatus which is not registered in the server 12 logs on to the server 12, communication path between that apparatus and the server 12 is not established.

In the remote failure analysis system 1, each customer is allowed to possess a customer failure analysis apparatus 11A comprising e.g. a notebook personal computer and having the same failure analysis function as that of the failure analysis apparatuses 11 installed in the service center 10. Therefore, even when a person of the customer who is in charge of the maintenance of a machine tool 20 is away on a business trip, the person can perform the failure analysis of the machine tool 20. Also with respect to the customer failure analysis apparatus 11A, remote failure analysis by the use of the apparatus 11A by the person who is in charge of the maintenance of the machine tool 20 is not allowed unless the user ID and password of the customer failure analysis apparatus 11A is registered in the server 12 in advance.

In this way, since each customer is allowed to possess a customer failure analysis apparatus 11A, leakage of operation information of a machine tool of a customer to the outside through the customer failure analysis apparatus 11A of another customer is prevented in the following manner. That is, with respect to each of the machine tools 20, certain failure analysis apparatuses 11, 11A can be designated as the apparatuses authorized to perform the failure analysis of that machine tool 20 and can be registered in the server 12 in advance so that the failure analysis apparatuses 11, 11A which are not authorized to perform remote failure analysis cannot perform remote failure analysis. Normally, the failure analysis apparatuses 11 installed in the service center 10 and the customer failure analysis apparatus 11A which the customer possesses are registered in the server 12.

Figure 2:
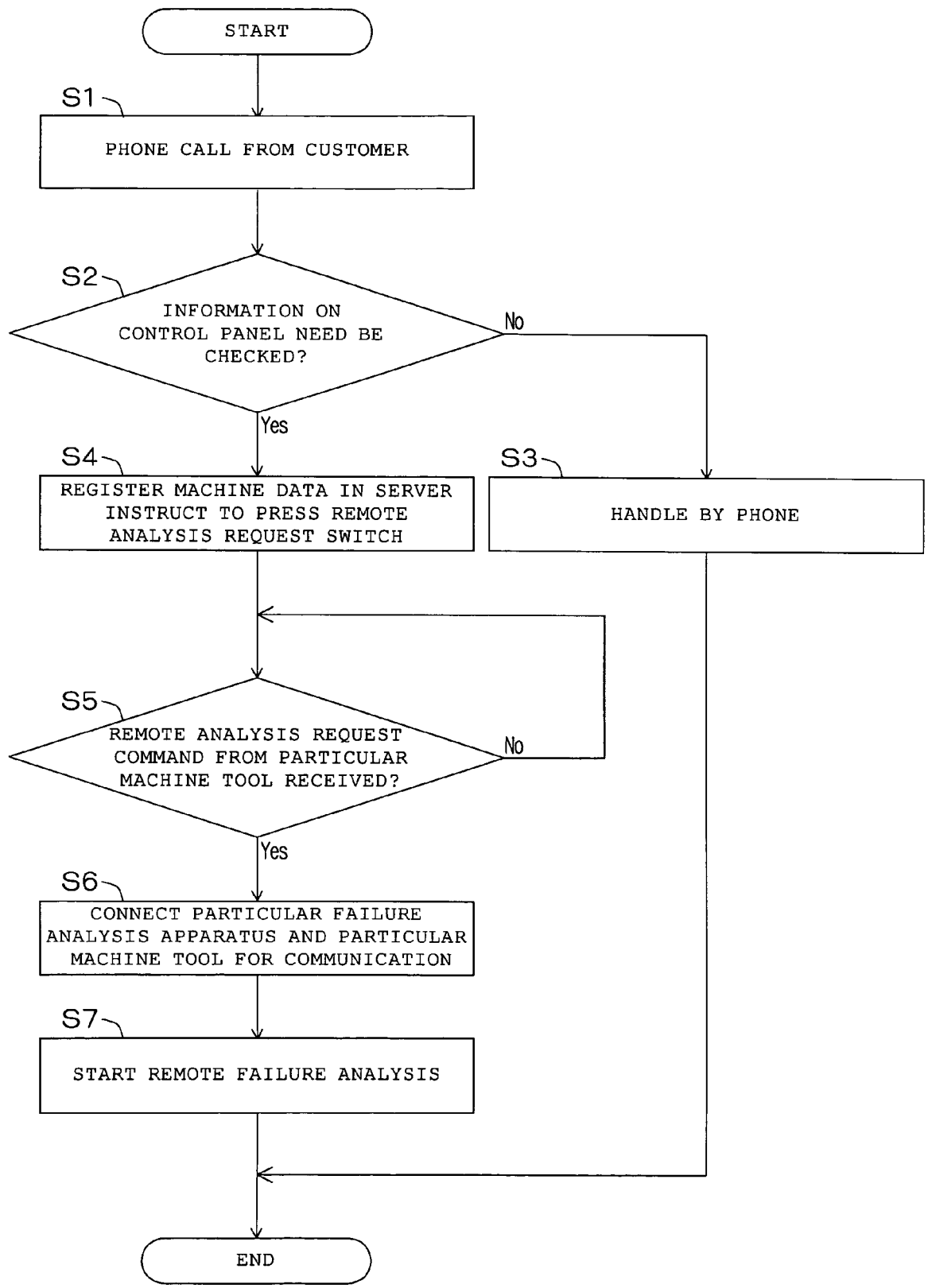
FIG. 2 is a flowchart showing a process of remote failure analysis by the remote failure analysis system.

The remote failure analysis of machine tools 20 by the remote failure analysis system 1 having the above structure will be described with reference to the flowcharts shown in FIGS. 2 and 3. FIG. 2 shows the process of remote failure analysis performed when the service center 10 of a machine tool manufacturer receives a phone call from a person of a customer who is in charge of the maintenance, reporting a trouble in a machine tool 20 of the customer. It is to be noted that all the failure analysis apparatuses 11 installed in the service center 10 are constantly connected to the server 12, and failure analysis apparatuses 11 which are not performing remote failure analysis are kept ready to immediately start remote failure analysis.

As shown in FIG. 2, when there is a call from a person of a customer who is in charge of the maintenance to the service center 10 of a machine tool manufacturer, reporting a trouble in a machine tool 20 of the customer (Step S1), the serviceman who got the call hears details of the trouble occurred in the machine tool (hereinafter referred to as "particular machine tool") 20 from the person in charge of the maintenance and determines whether or not information on the control panel of the particular machine tool 20 (e.g. operation information or alarm information) need be checked (Step S2).

When the serviceman determines that information on the control panel need not be checked, the serviceman does not perform remote failure analysis and explains, by telephone, to the person in charge of the maintenance how to deal with the trouble (Step S3). When the serviceman determines that the check of the information on the control panel is necessary, the serviceman registers the machine data, i.e. the user ID and serial number of the particular machine tool 20 in the server 12 by using his or her failure analysis apparatus 11, thereby putting the failure analysis apparatus (hereinafter referred to as particular failure analysis apparatus) 11 in a reserved state for waiting instruction, and instructs the person in charge of the maintenance to press a remote analysis request switch provided on the control panel of the particular machine tool 20 (Step S4). When the remote analysis request switch of the particular machine tool 20 is pressed in accordance with the instruction of the serviceman, the particular machine tool 20 is connected to the server 12 via the Internet 30, whereby remote analysis request command is transmitted from the particular machine tool 20 to the server 12.

When the particular failure analysis apparatus 11 is put in the reserved state for waiting instruction in the above-described manner, the server 12 checks whether or not the remote analysis request command from the particular machine tool 20 has been received (Step S5) If the remote analysis request command from the particular machine tool 20 has not been received yet, the server 12 waits until the command is received.

When the server 12 receives the remote analysis request command from the particular machine tool 20, the server 12 connects the particular failure analysis apparatus 11 and the particular machine tool 20 to each other for allowing communication therebetween (Step S6). Thus, the serviceman remotely controls the control panel of the particular machine tool 20 by using the particular failure analysis apparatus 11 to obtain operation information or alarm information, etc. of the particular machine tool 20 and performs failure analysis of the particular machine tool 20 based on the information (Step S7).

When the person of the customer who is in charge of the maintenance of a machine tool 20 is notified of the occurrence of trouble in the machine tool 20 during a business trip, the person in charge of the maintenance connects his or her customer failure analysis apparatus 11A to the server 12 of the service center 10 via the Internet and registers the user ID and serial number of the machine tool 20 in the server 12 as a machine tool to be subjected to remote failure analysis.

Thereafter, the person gives instruction to press the remote analysis request switch provided on the control panel of the machine tool 20 by telephone. Thus, remote failure analysis of the machine tool 20 can be performed similarly to the above-described case (Step S5–Step S7) in which a serviceman of the service center 10 performs remote failure analysis of the machine tool 20 of a customer.

Figure 3:
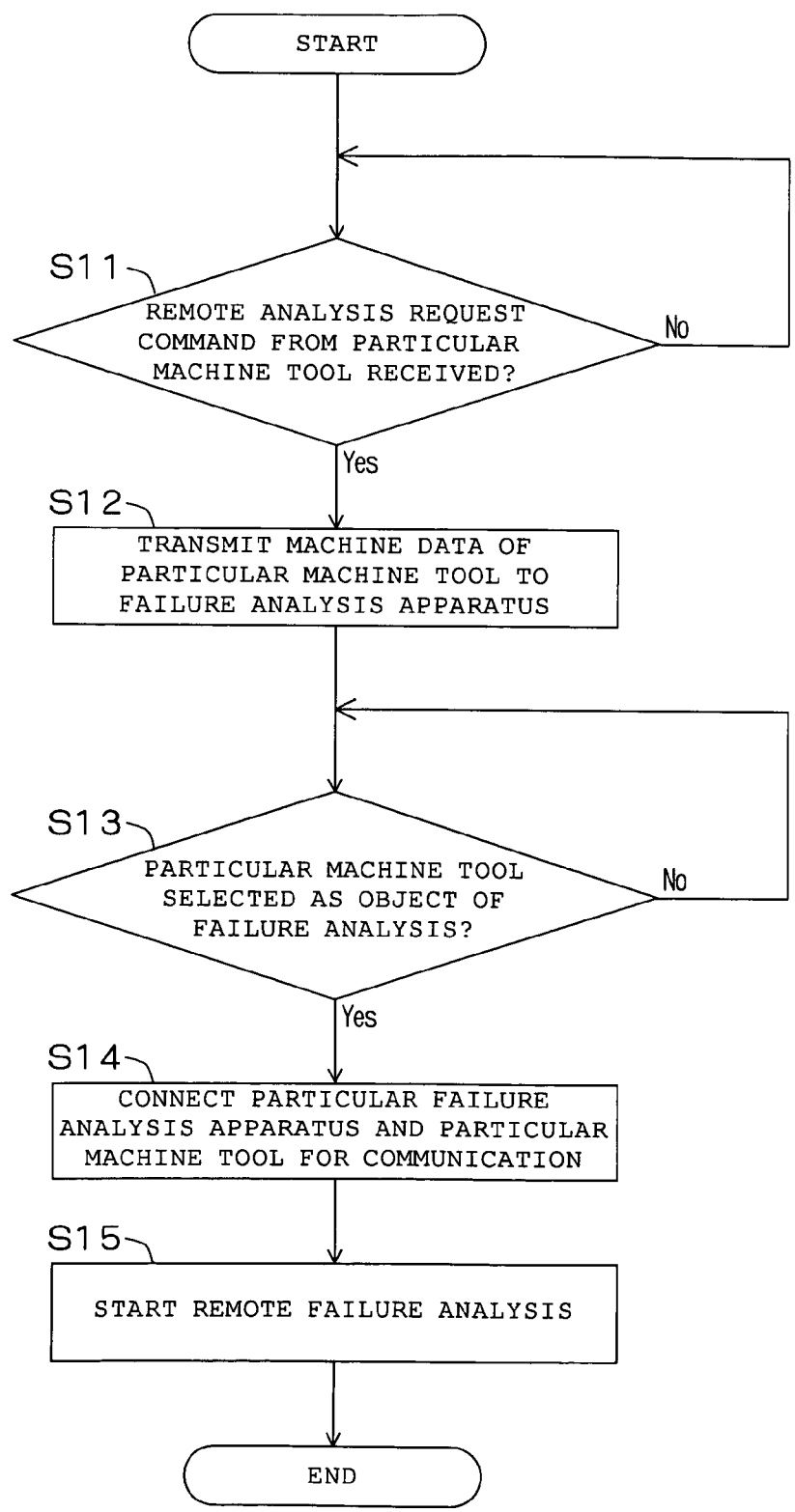
FIG. 3 is a flowchart showing a process of remote failure analysis by the remote failure analysis system.
Figure 4:
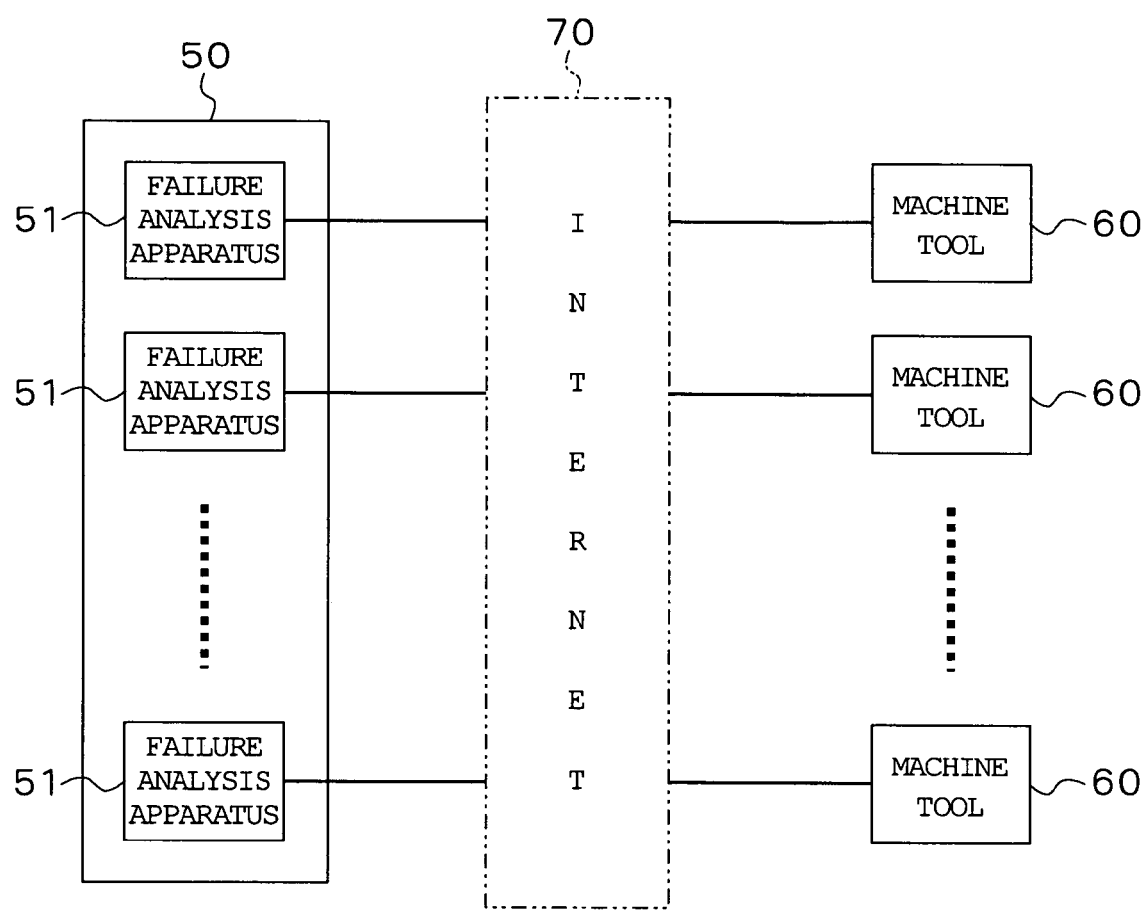
FIG. 4 is a schematic view showing the structure of a prior-art remote failure analysis system for machine tools.

FIG. 3 shows the process of remote failure analysis performed when a person of a customer who is in charge of the maintenance of a machine tool 20 presses the remote analysis request switch on the control panel of the machine tool 20 without making a phone call to the service center 10 of the machine tool manufacturer. Also in this case, all the failure analysis apparatuses 11 installed in the service center 10 are constantly connected to the server 12, and failure analysis apparatuses 11 which are not performing remote failure analysis are kept ready to immediately start remote failure analysis.

First, when the remote analysis request switch on the control panel of a machine tool 20 of a customer is pressed, the machine tool 20 (hereinafter referred to as "particular machine tool") is connected to the server 12 via the Internet 30, whereby remote analysis request command is transmitted from the particular machine tool 20 to the server 12.

As shown in FIG. 3, when the server 12 receives the remote analysis request command from the particular machine tool 20 (Step S11), the server 12 transmits the machine data, i.e. the user ID and serial number of the particular machine tool 20 to the failure analysis apparatus 11 or the customer failure analysis apparatus 11A which satisfies a particular condition (Step S12). Herein, the "failure analysis apparatus which satisfies a particular condition" means all failure analysis apparatuses 11, 11A which are authorized to perform remote analysis control of the particular machine tool 20 and which are not currently performing remote failure analysis. However, the failure analysis apparatus 11 which is in a reserved state for waiting for failure analysis request from a certain machine tool 20 is not included.

In each failure analysis apparatus 11 of the service center 10 which is constantly connected to the server 12, the user IDs and serial numbers of the machine tools 20 which are requesting failure analysis and failure analysis of which is allowed are displayed as a list. When a serviceman who has determined to perform remote failure analysis of the particular machine tool 20 selects the particular machine tool 20 by his or her failure analysis apparatus 11 (Step S13), the server 12 connects the failure analysis apparatus 11 (hereinafter referred to as "particular failure analysis apparatus") and the particular machine tool 20 to each other for allowing communication therebetween (Step S14). Thus, the serviceman remotely controls the control panel of the particular machine tool 20 by using the particular failure analysis apparatus 11 to obtain operation information, alarm information, etc. of the particular machine tool 20 and performs failure analysis of the particular machine tool 20 based on such information (Step S15).

As described above, the remote failure analysis system 1 includes server 12 for connecting a plurality of machine tools 20 and a plurality of failure analysis apparatuses 11 to each other via the Internet 30 for communication, and the machine tools 20 and the failure analysis apparatuses 11 make a request to the server 12 for communication as a client. Therefore, it is only necessary to allocate a global IP address for the exclusive use to the server 12. Accordingly, unlike the prior art remote failure analysis system in which machine tools and failure analysis apparatuses are directly connected to each other via the Internet, it is unnecessary to allocate a global IP address for the exclusive use to each of the machine tools or each of the failure analysis apparatuses.

Therefore, the cost for obtaining and maintaining the global IP address can be reduced to the minimum. Even when the number of machine tools 20 for which failure analysis is to be performed is increased, it is unnecessary to newly obtain a global IP address. Therefore, the scale of the system can be efficiently increased at a low cost.

In the remote failure analysis system 1, the server 12 connects a particular machine tool 20 and a particular failure analysis apparatus 11 to each other only when both of the two request communication. Therefore, direct intrusion into the machine tool 20 or the failure analysis apparatus 11 from e.g. an external network can be prevented, so that the system is advantageous also in terms of security.

Particularly, in the remote failure analysis system 1, the machine tool 20, the failure analysis apparatus 11 and the customer failure analysis apparatus 11A which are allowed to be connected are registered in advance in the server 12. Therefore, unauthorized access to the server 12 from an apparatus etc. which is not registered in the server 12 is reliably prevented.

Although the remote failure analysis system 1 for performing remote failure analysis of a machine tool 20 is described in the foregoing embodiment, the present invention is not limited thereto. The present invention is applicable to various kinds of remote control systems for remotely controlling apparatuses such as robots, vehicles, or household electrical appliances by connecting such apparatuses to controlling apparatuses via the Internet.

Further, in the foregoing embodiment, when the server 12 connects the particular failure analysis apparatus 11 and the particular machine tool 20 to each other for communication, a serviceman obtains operation information or alarm information of the particular machine tool 20 to perform failure analysis. However, the present invention is not limited thereto, and the serviceman can obtain information on various kinds of externally connected apparatus such as an apparatus (e.g. digital camera) attached outside the machine tool, for example.

Although the system according to the foregoing embodiment utilizes the Internet, the invention is not limited thereto. For example, the apparatus such as a machine tool may be connected to the failure analysis apparatus from a cellular phone network by a lease line. In such a case, stable communication without the influence of Internet traffic can be performed.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

What is claimed is:

1. A remote control system comprising:
   a plurality of object apparatuses to be controlled;
   a plurality of controlling apparatuses for controlling the object apparatuses; and
   a server for connecting the object apparatuses and the controlling apparatuses to each other for allowing communication therebetween;
   wherein the server establishes a communication path between a particular one of the object apparatuses and a particular one of the controlling apparatuses only when both of the particular object apparatus and the particular controlling apparatus request communication.

2. The remote control system according to claim 1, wherein object apparatuses to be controlled and/or controlling apparatuses can be registered in the server in advance as apparatuses which are allowed to be connected.

3. The remote control system according to claim 1, wherein the object apparatuses comprise machine tools, and wherein the operating apparatuses comprise failure analysis apparatuses for analyzing failure of the machine tools while remotely controlling the machine tools.

* * * * *